United States Patent [19]

Noguchi et al.

[11] 4,103,357
[45] Jul. 25, 1978

[54] PROCESS AND DEVICE FOR CONTINUOUS METERING AND MIXING

[75] Inventors: Haruo Noguchi, Yokohama, Japan; Max Reinhard, Bad Homburg, Fed. Rep. of Germany

[73] Assignees: Colortronic Reinhard & Co., KG, Friedrichsdorf-Koppern, Fed. Rep. of Germany; Colortronic Co., Ltd., Tokyo, Japan

[21] Appl. No.: 711,422

[22] Filed: Aug. 3, 1976

Related U.S. Application Data

[62] Division of Ser. No. 529,064, Dec. 3, 1974, Pat. No. 3,989,229.

[30] Foreign Application Priority Data

Dec. 5, 1973 [DE] Fed. Rep. of Germany ....... 2360644

[51] Int. Cl.² .............................................. B01F 15/04
[52] U.S. Cl. .................................... 366/152; 366/181; 366/183
[58] Field of Search ...................... 259/8, 7, 23, 24, 43, 259/44, 4 R, 18, 6, 5; 222/56, 64

[56] References Cited

U.S. PATENT DOCUMENTS

| | | | |
|---|---|---|---|
| 2,674,396 | 4/1954 | Peterson | 222/56 |
| 3,370,837 | 2/1968 | Piot | 259/8 |
| 3,425,667 | 2/1969 | Schutte | 259/23 |
| 3,659,748 | 5/1972 | Beck | 222/64 |

*Primary Examiner*—Robert W. Jenkins
*Attorney, Agent, or Firm*—Webb, Burden, Robinson & Webb

[57] ABSTRACT

A process and apparatus for mixing synthetic materials and complemental raw materials in a fixed ratio. The synthetic material is fed under the pressure of its own weight to a mixing vessel through a feed conduit having an opening arranged to feed below the top of the vessel. The opening of the conduit is also arranged such that synthetic material will only feed to the vessel when the materials therein fall below the level of the conduit opening. The complemental raw materials are fed over the top of the materials in the vessel at a mass rate of flow proportional to the mass rate of flow of the materials withdrawn from the bottom of the vessel. The synthetic materials are thereby also fed to the vessel in a fixed ratio to the mass rate of flow of the materials to be withdrawn.

4 Claims, 10 Drawing Figures

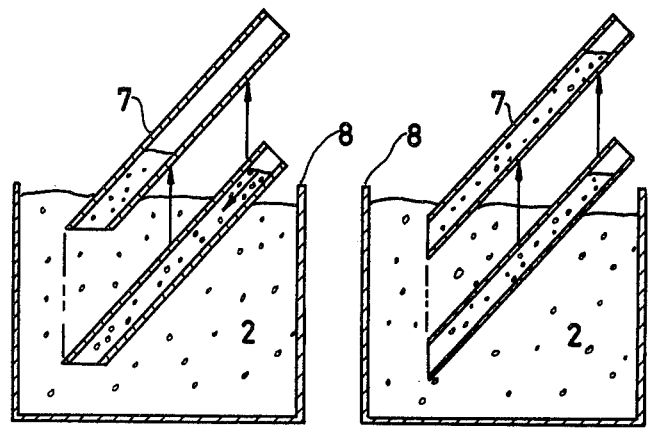
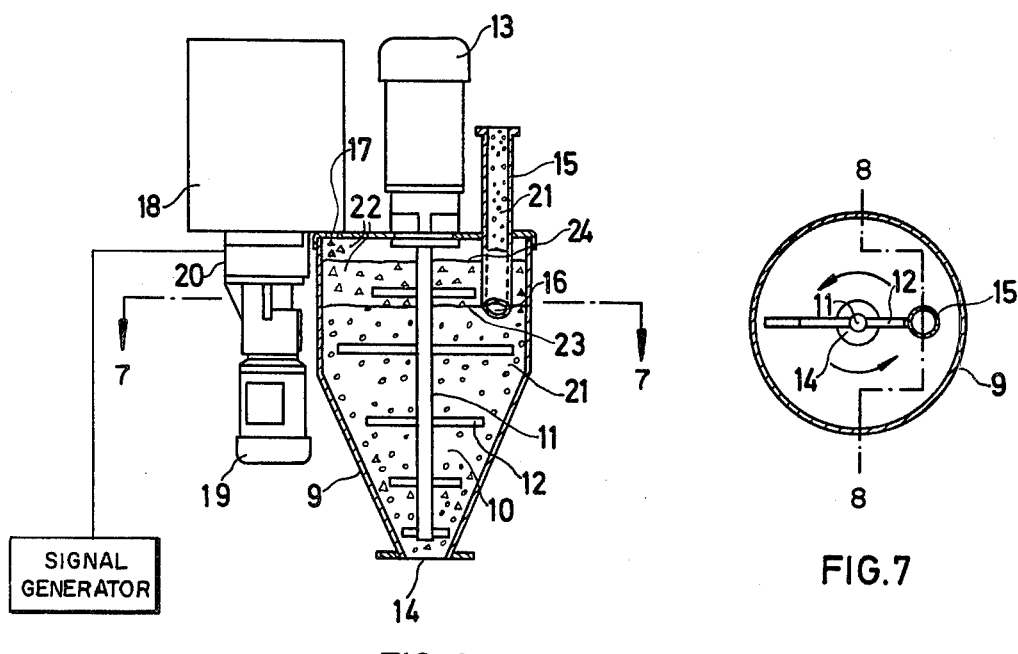

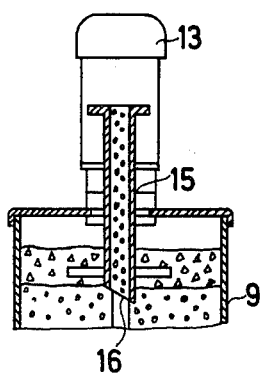
FIG.8
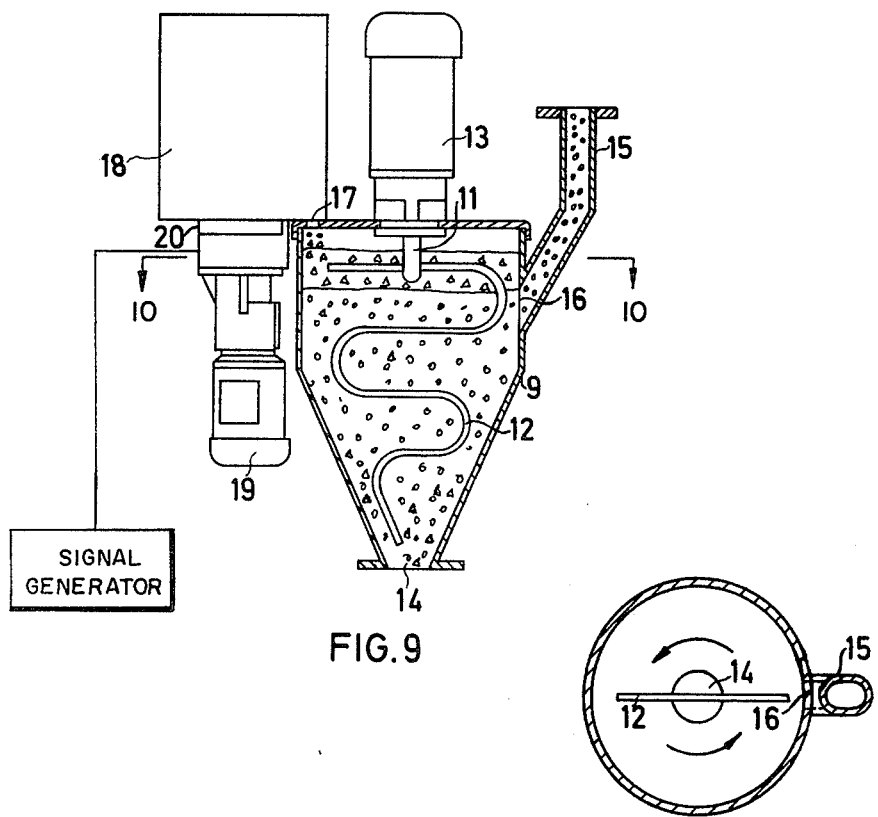
FIG.9
FIG.10
SIGNAL GENERATOR

PROCESS AND DEVICE FOR CONTINUOUS METERING AND MIXING

This is a division, of application Ser. No. 529,064, filed 12/3/74, now U.S. Patent No. 3,989,229.

BACKGROUND

The invention relates to a process for mixing a synthetic material with complemental raw materials such as a pigment, another synthetic material and an additive. The materials are introduced into a mixing vessel through inlet ports. Each material is introduced at a rate such that a specific mixing ratio is established. The materials are mixed with one another in the specific mixing ratio and the resultant mixture is delivered into a processing machine by way of an outlet port in the mixing vessel.

Synthetic materials (plastics) are usually mixed or blended with other complemental raw materials. The exclusive use of synthetic materials without an additive is very rare. In general, more than one complementary material is mixed with the synthetic material and the proportions of these complemental materials are very small. From the economic standpoint, therefore, it is extremely advantageous to blend the raw materials with one another in the from of a mixture. Since the mixing operation requires numerous manipulations and the work area is frequently contaminated in the process, more recently there has been a considerable demand for automatic metering, mixing, and blending of the raw materials. Because of the great multiplicity of the materials that are to be added, and because of the difficulty in transporting these materials in a clean condition, it is also most desirable that the automatic mixing devices be mounted individually on the corresponding processing machines.

It is a known practice to provide a mixing vessel directly in front of the raw-material-admission-port of a processing machine with a metering apparatus being made available for each material that is to be blended. Through this metering apparatus the material is proportioned properly and is introduced into the mixing vessel in such a way that a given mixing ratio will be established between the materials. The materials are mixed with one another in the mixing vessel and are then discharged therefrom. However, it has proven very difficult to carry out the metering, mixing, and blending in processing machines of small capacity, and in many cases it is absolutely impossible to achieve satisfactory results. In one conventional automatic device of the type mentioned, a batch mixer is used. This conventional procedural method involves problems in the accuracy of the composition ratio, in the latter's variability, and in equipment costs. These drawbacks were successfully overcome by a device with a vertical continuously operating mixing vessel which is described in Japanese Patent Application No. 81,760/72. But this type of mixing does not differ from the conventional method to this extent that a separate metering device must still be provided for each of the raw materials that are to be blended. Consequently, this known apparatus is too expensive for processing machines of small capacity.

In another Japanese Patent Application, No. 15,273/72, a process was proposed in which a liquid coloring agent that is made by dispersing a pigment in liquid or paste form is injected into a synthetic material which is supplied from a hopper for the material. This liquid coloring agent is filled into the inlet port of the processing machine by means of a metering pump at a rate that is synchronous with the velocity of the mass of the material that is treated in the processing machine. This process works only if the complemental material that is to be added is in liquid form. It was developed as an automatic dyeing method in which the pigment is introduced in liquefied condition. Consequently, it is necessary to provide only a metering apparatus for the liquid coloring agent. It is not necessary to provide a metering apparatus for the main raw material. In this way equipment costs can be reduced. This mixing apparatus has entered the field of technology as an automatic dyeing apparatus that is to be mounted on an individual processing machine of small capacity. Although this automatic dyeing process is economical and effective when only one coloring agent is to be introduced into the main raw material, problems are encountered because aside from the coloring agent no complemental materials can be mixed or added at the same time. Moreover, the coloring agents that are usable for this process are limited exclusively to liquid coloring agents so that frequently used pulverized pigments cannot be employed. This is another drawback to this known process.

In a conventional, automatically operating mixing apparatus in which all of the raw materials are introduced into a mixing vessel and are mixed with one another, various types of raw materials can be mixed or blended with one another at the same time regardless of whether they are present in a liquid, pulverulent, or granulated form. But for each raw material that is to be mixed, a separate combination is required which consists of a metering apparatus, a drive mechanism, and a governing device, so that the equipment costs are very high and this apparatus is therefore suitable only for processing machines of medium to large capacity.

In the above mentioned automatic dyeing process using a liquid coloring agent, the main material is always introduced into a supply line which extends from a hopper or silo above the mixing vessel and in which the main material drops down by gravity. In this way the main material arrives at the inlet port of the processing machine with a pressure column (to be referred to hereinafter as "pressure of the raw material column") and the complemental raw material, such as the liquid coloring agent, is injected into the main raw material and is mixed therewith at a constant rate. In this case the velocity of the mass (flow rate) of the material treated in the processing machine, for example, the number of injection cycles in an injection molding machine, is used as the means for actuating the metering mechanism for the raw material. After the main raw material and the complemental raw material have been thusly combined, an agitator or stirring apparatus may be provided, and this involves no problems. In other words, in this process mixing and blending can be carried out. It follows from this that if quantitative feeding of non-liquid, complemental materials, such as a powdered pigment and a reclaimed (recycled) product were possible in the above mentioned automatic dyeing process for liquid coloring agents, the result would be an excellent process which operates at low cost. However, since the quantitative feeding of powdered materials is impossible or difficult, no such process has been successfully realized up to the present time.

When a liquid pigment is introduced into the pressure column of the main raw material, based upon the mass flow rate, it should be introduced near the delivery point. It has been assumed the delivery point should be located in a narrow passage in vicinity of the inlet port of the processing machine. Then compared to the flow rate of the material treated in the processing machine, i.e., the injection cycle, the amount of pigment administered a number of times at this narrow point is substantially less than the amount of pigment introduced into the mixing vessels of the larger capacity in other conventional processes. The pressure feeding of pigment in a highly accurate, measured meter is possible only when the pigment is in a fluid state.

If a high grade metering pump is used, a small amount of fluid ranging from 0.1 to 1 g can then be introduced under pressure into the main raw material with a high degree of accuracy. Since no overly great amounts are present, the fluid can then be enclosed to an adequate extent in vacuums which form between the particles of the main raw material; this is the case even when the raw material has not been pushed aside especially or forced up.

On the other hand, solids cannot be fed under pressure by means of metering devices and feeding devices with the exception of a special device, such as a screw conveyor. When a screw conveyor is used, it is possible to feed in a very small amount of pulverized pigment under pressure against the pressure column of the main raw material, but the metering accuracy of a screw conveyor is generally not very great and consequently no adequate accuracy can be expected for an automatic mixing process from the use of such a device, and such a process will not work in actual practice. When using a complemental raw material other than a pigment, such as a reclaimed product or a synthetic that differs from the main material, a large amount must be added which at times amounts to 50 to 70% of the total material. The pressure feeding of such a huge amount of complemental raw material against the pressure head of the main raw material can be accomplished only by forcing it into the stream of the main raw material. Such an amount cannot be fed in even with the use of a screw conveyor.

No device has as yet been developed with which complemental solid raw materials can be combined with the pressure column of the main raw materials in a manner similar to that described above for the automatic dyeing process for liquid coloring agents. It is an advantage of this invention to create a mixing apparatus by means of which at very small cost (a) complemental solid raw materials can be quantitatively combined with the pressure column of the main raw material using small as well as large mixing ratios, (b) ordinary mixing devices for solids can be used as the mixing device for the complemental raw material, the said devices allowing the solids to be delivered only into the open, (c) the accuracy of the addition of each complemental raw material can be raised to a level that is adequate for the mixing purpose, and (d) a continuously operating mixing vessel can be used.

BRIEF DESCRIPTION

The invention accomplishes these advantages by providing a continuously operating mixing vessel with a mixing chamber that extends substantially vertically from an inlet port to an outlet port, the mixture being moved downwardly in the mixing chamber by its own weight at a rate that corresponds to the mass flow rate of the material treated in the feed machine, and the outlet port of the mixing vessel being connected to the feed or processing machine. A feedline through which the main raw material is supplied from another system by its own weight and always in the state in which it was charged into the supply line is connected to the mixing vessel by way of an opening which is disposed parallel to the line of flow of an agitator current or which is so disposed that it assumes a positive angle of impingment relative to the line of flow. In this way, the main raw material will only charge the mixing chamber if the opening of the feedline is not blocked by material in the vessel. A chamber adequate for supplying the complemental raw material is disposed in the interior of the mixing vessel above the upper end of the opening of the feedline. One or more complemental raw materials are fed into the chamber of the mixing vessel above the opening by suitable metering mechanism in proportion to the mass flow rate of the material treated in the feed or processing machine.

In feeding the complemental raw material in accordance with the invention, since there is a delay in time between the feeding of the main raw material and the feeding of the complemental raw material, it frequently happens that the raw material forms various layers, in a vertical direction, at the point located directly behind the feeding point of the raw materials into the mixing vessel. This results in an uneven or heterogeneous mixture. In order to do away with this heterogeneity before the mixture emerges from the outlet port of the mixing vessel, a rotating agitator having a substantially vertical shaft should be provided. The supply or feedline for the main raw material may be connected to the side wall of the mixing vessel with the opening section of the feedline in alignment with or run parallel to the inner wall of the mixing vessel.

Compared to a mixing apparatus for liquids, the smallest unit for a mixing apparatus for solids is larger. It is difficult to accurately set the metering in mixing apparatuses for solids. In a volumetric metering and feeding device, for example, a certain volume corresponds to a minimum metering unit. Accordingly, when complemental raw materials are metered and are conducted to the mixing vessel at each injection cycle in injection molding and when the amount injected in one injection cycle is scant, it sometimes happens that the predetermined mixing ratio for the complemental raw material becomes too high or that the actually attained mixing ratio deviates so markedly from the prescribed mixing ratio that difficulties in operation will arise.

The invention effectively overcomes this drawback and maintains all the mixing ratios with a high degree of accuracy even with very small amounts of material by introducing the complemental raw material not at a narrow passage in the vicinity of the processing machine, but rather into a mixing vessel with a given capacity.

The invention affords the following advantages: A continuously operating mixing and blending apparatus is provided which is distinguished by a high output capacity with small structural dimensions and low equipment costs. It eliminates the necessity for a metering device and an associated drive and control mechanism for the metering device for the main raw material, which results in a further reduction in equipment costs. It is consequently possible to mount such automatically operating mixing devices individually on an injection molding machine of small capacity. Since the apparatus is further simplified, any possible operational breakdowns are reduced to a similar degree. When the device of the invention is connected directly to the inlet opening of the processing machine, contamination by the immediate surroundings can be effectively prevented. When the mixing ratio is changed, the loss of raw materials caused by cleaning or the like can also be held to a minimum.

THE DRAWINGS

Exemplifying embodiments of the invention will now be more fully explained with the aid of drawings, in which:

FIG. 1 relates to prior art devices;

FIGS. 2, 3, 4 and 5 relate to an exposition of a principle upon which this invention builds;

FIG. 6 is a schematic view, partially in section, of a first embodiment of the device of the invention;

FIG. 7 is a section taken along line A—A' of FIG. 6;

FIG. 8 is a fragmentary section taken along line B—B' of FIG. 7;

FIG. 9 is a schematic view, partially in section, of another embodiment of the device of the invention; and, FIG. 10 is a section taken along line C—C' of FIG. 9.

DETAILED DESCRIPTION

Figure 1:
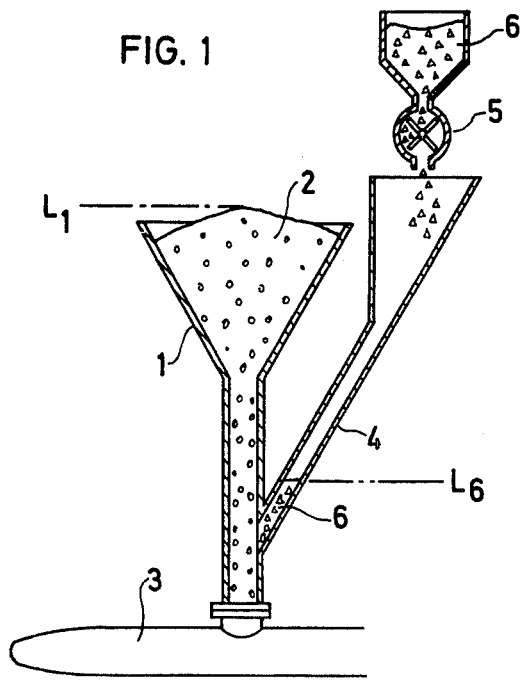

Referring to FIG. 1 a hopper 1 is shown for a raw material 2 which forms a pressure column extending to a processing machine 3. A branch 4 serves to feed the complemental raw material 6 into the pressure column of the main raw material. The solid-like raw material 6 is introduced into branch 4 by way of a metering and feeding device 5. The amount of the complemental raw material delivery is governed according to the mass flow rate of the material treated in the processing machine 3.

If the injected amount in one cycle of processing machine 3 is 1 kg and the mixing ratio of the main and the complemental raw materials is 50/50, i.e., 0.5 kg/0.5 kg, so that the metering device 5 will deliver 0.5 kg of complemental raw material into branch 4 per injection cycle, then the desired mixing ratio of 50/50 can be obtained only if the 0.5 kg of complemental raw material is absorbed completely in the area of flow below the point of discharge of the branch by only 0.5 kg of the main raw material 2 in the pressure column at the point in question. If the main raw material 2 is fed into the flow in greater amounts than the complemental raw material is fed thereinto, or if there are 0.8 kg of main raw material 2 below the branching-off point per injection cycle, then only 0.2 kg of the complemental raw material 6 will be withdrawn from branch 4 per injection cycle while 0.3 kg of it will remain in branch 4 per injection cycle, so that the filling level $L_6$ will rise in branch 4. If, therefore, the branch is merely so designed that there is a connection of the complemental raw material with the pressure column of the main raw material and if the complemental raw material is fed into the branchline continuously in meters, there is absolutely no guarantee that the complemental raw material will be mixed quantitatively with the main raw material below the discharge point of the branchline. So, in general, it is not possible to achieve a quantitative mixture with the device shown in FIG. 1 without special measures. However, if the complemental raw material is pressed into the pressure column of the main raw material by means of a metering pump or a screw conveyor, a quantitative intermixture will be possible.

Under but one condition is it possible to obtain the intended mixing ratio both constantly and reliably. This is the case when the complemental raw material 6 is introduced without presssure or in a pressureless state from the metering and feeding mechanism 5. This condition prevails when the entire 0.5 kg of the pressurelessly fed complemental raw material 6 flows absolutely into the flow below the discharge point at every injection cycle of the machine, and if thereafter the main raw material can flow into the stream below the connecting point in only such amounts that a feeding for one injection amount, i.e., 0.5 kg, will take place. In this case it is important that the entire pressurelessly supplied complemental raw material is introduced from the metering device into the mixing zone, and that the deficiency for the injected amount is compensated for by the main raw material from the pressure column. Thus, it is absolutely essential to avoid overfeeding with main raw material beyond the prescribed mixing ratio.

Figure 2:
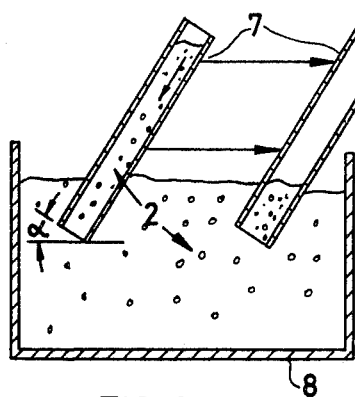
Figure 3:
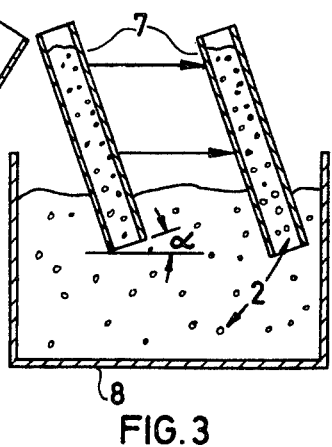

More particularly, tests of the type illustrated in FIGS. 2 and 3 were carried out. As shown in FIGS. 2 and 3, synthetic particles in a state of quiescence are filled into a container 8. If the synthetic particles are introduced into a hollow cylinder 7 and if the cylinder, as shown in FIG. 2, is moved horizontally in a slanted position, then due to their own weight, the particles will flow downwardly into receptacle 8. If, on the other hand, horizontal cylinder 7 is moved horizontally at an inclined angle as shown in FIG. 3, the particles will not get into container 8 independently of the pressure gradient. In FIGS. 2 and 3 the symbol alpha always indicates the angle enclosed between the apertural surface of the cylinder of the direction of movement. If the alph angle of FIG. 3 opens up in the direction of flow of the particles — this will subsequently be designated as a positive angle of impingement — no particles will emerge from cylinder 7, i.e., from the pressure column, even during movement through the particles. But if, as shown in FIG. 2, the alpha angle opens up oppositely to the direction of movement — this will subsequently be designated as a negative angle of impingement — the particles will flow downwardly out of the pressure column. Even if in the test of FIG. 3 the cylinder is gradually straightened up until the alpha angle = 0 and the apertural surface is parallel to the direction of movement, the emergence of particles from the cylinder is basically negligible.

The above described phenomenon was also studied in connection with a vertical movement of the cylinder, as shown in FIGS. 4 and 5. In FIGS. 4 and 5 the cylinder is moved vertically each time. If the apertural surface assumes a negative angle of impingement, as in FIG. 4, the particles will flow downwardly immediately. If, however, the apertural surface is parallel to the direction of movement, as shown in FIG. 5, there will be no flow of the particles, even when the cylinder is pulled upwardly.

In this process the complemental raw material which is fed without pressure from the metering device is preferably absorbed in the mixing chamber of the mixing vessel below the discharge point, the main raw material being supplied only in such an amount that the deficiency of raw material is complemented in proportion to the mass flow rate of the material treated in the machine.

One exemplary embodiment of the mixing apparatus of the invention is shown in FIG. 6. This includes a mixing vessel 9, an agitator 10, a rotary shaft 11, agitator vanes 12, agitator motor 13, and a discharge opening 14. A supply line 15 is used for the main raw material and has an outlet opening 16. The drawing also shows an inlet 17 for the complemental raw material, a metering and feeding device 18 for the complemental raw material, a motor 19 for the said metering device, an impulse generating element 20, the main raw material 21, the complemental raw material 22, upper level 23 of opening 16, and upper level 24 of the complemental raw material in the mixing vessel.

Discharge outlet 14 is disposed in the bottom portion of mixing vessel 9 and is usually connected directly with the receiving opening (not shown) for the raw material of the processing machine. The raw material in mixing vessel 9 moves downwardly due to its own weight as soon as the raw material is used up by the processing machine. Due to this arrangement it is possible to make the mass flow rate of the raw material treated in mixing vessel 9 coincide with the mass flow rate of the material treated in the processing machine. Supply line 15 is connected directly with a storage bin (not shown) for the main raw material and is filled with raw material that is under the pressure gradient from the storage bin. When the operation starts, i.e., when mixing vessel 9 is empty, the main raw material 21 drops out of feedline 15 into mixing vessel 9 and fills the empty mixing vessel. If there is no agitator action at this point, the flow of main raw material is stopped as soon as the crest of a pouring cone of raw material which has been formed in mixing vessel 9 reaches opening 16, the said cone spreading out from this point at the angle of rest. When agitator 10 is actuated, the angle of rest in the upper portion of the pouring cone will be disturbed which results in an additional feeding of main raw material from feedline 15. However, as explained above, the line of intersection of opening 16 is disposed parallel to the line of flow or movement of the agitator current, and/or it assumes a positive angle of impingement to the line of flow, so that the supply of the main raw material will be stopped exactly when the upper level of the main raw material has reached the upper end of opening 16. (With a negative angle of impingement or the like, the main raw material which is under the pressure gradient would fill into the mixing vessel continuously, regardless of the position of opening 16, until it reaches the ceiling of the mixing vessel.) In contrast to this, in the embodiment of the device shown in FIG. 6, there is a constant rotational flow in the horizontal direction. The direction of rotation of the agitator current is indicated by arrows in FIG. 7. Opening 16 opens up at an angle, compare FIGS. 6 and 8, so that the opening assumes a sufficiently positive angle of impingement relative to the line of flow of the rotating current. Due to this special design, although the processing machine is using up raw material and although the raw material is being stirred in the mixing vessel, the upper level of main raw material 21 can always be kept precisely at the upper end 23 of the opening as long as no complemental raw material is introduced.

If a given amount of complemental raw material 22 which is weighed by the metering and feeding device is fed into mixing vessel 9 by way of inlet port 17, the topmost level of raw material in the vessel will temporarily rise to point 24. However, since the raw material in mixing vessel 9 drops down into the processing machine due to the consumption of the raw material, the upper filling level 24 of the complemental raw material will drop gradually, as long as no additional complemental raw material is fed in. But the main raw material 21 will be unable to drop out of feedline 15 until the upper filling level 24 has sunk down to the final level 23 of opening 16. As soon as the upper level 24 of complemental raw material has dropped below the topmost final level 23 of the opening 16, main raw material will be fed for the first time from feedline 15.

The mass flow rate of the material treated in the processing machine is proportional to the mass flow rate of the material treated in the mixing vessel. Thus at each interval, when a given number of mold parts has been prepared by the molding machine, the complemental raw material 22 can be metered and can be fed by the metering and feeding device 18 in an amount that will correspond exactly to the number of mold parts. The accurate admixture of main raw material 21 may be carried out without metering the amount of main raw material 21.

In a conventional processing machine for synthetics any desired signal such as an electrical impulse signal, may be given at each interval of time as soon as a certain amount of material has been formed without the necessity of providing any special equipment therefor. In an injection molding machine an injection cycle may be adopted, for example, as the means for emitting such a signal. In an extruder the ejection speed or the rpm of the screw can be used for this purpose. Accordingly, if a signal is transmitted at each cycle by using the factor mentioned and if this signal is fed to a control mechanism (not shown) for governing the metering apparatus 18 and if the complemental raw material is consequently metered in a given amount, the goal set forth in the introduction can be achieved. This governing may be undertaken by any type of well-known electric, electronic, or pneumatic means. When using a so-called volumetric metering device in which the volume of the material is metered by rotating a metering mechanism, then, if an impulse generating element 20 is mounted on the rotating shaft of the metering element for transmitting an impulse at each individual rotation, the quantitative feeding of the complemental raw material may be governed digitally which will substantially improve the quantitative accuracy of the feeding of the complemental raw material.

Another exemplifying embodiment of the invention is shown in FIGS. 9 and 10. This embodiment is distinguished by the fact that the feedline 15 for the main raw material discharges into the side wall of the mixing vessel. When regarding this device from above, as in FIG. 10, the intersecting line of opening 16 is in alignment with the inner wall of the mixing vessel. Since feedline 15 opens laterally, the intersecting line of opening 16 is not horizontal, as in the previously described embodiment, but is vertical. In the event that feedline 15 discharges into the lower, cone-shaped portion of the mixing vessel, the intersecting line of opening 16 is directed upwardly beyond the vertical.

Since feedline 15 opens vertically or upwardly beyond the vertical, when the raw material in the vessel sinks downwardly, the intersecting line of the opening will be parallel to the line of flow of the material in the vessel, and assume a positive angle of impingement to the line of flow. Consequently, the main raw material can be effectively prevented from moving down out of feedline 15. Just as in the previously described embodiment, in this embodiment the material is moved in the mixing vessel in such a way that there will be a horizontal rotational flow. Thus, when viewed from above, the intersecting line of opening 16 is parallel to the line of flow of the material that is in the vessel, but actually, due to the centrifugal force created by the rotating flow, pressure is exerted on opening 16, so that the effect of preventing the downward movement of the main raw material is substantially greater than in the case where the intersecting line of opening 16 is parallel to the line of flow of the material in the vessel. Furthermore, since feedline 15 does not extend into the interior of the mixing vessel, the movement of the agitator vanes is in no way impeded by feedline 15, and no raw material adheres to the feedline 15. The structural components of the mixing device of the invention will now be described in more detail. In both embodiments (FIGS. 6 and 9) a tube is used as feedline 15 for the main raw material, but the feedline is not limited to the type of tube shown. The shape, dimensions, and the angle of inclination of the feedline are likewise not of substantial importance. The storage silo for the main raw material may open up directly into mixing vessel 9. In other words, it is sufficient that an opening be disposed in the mixing vessel at the point at which the main raw material is fed in continuously, but the silo should always be filled and the intersecting line of the opening must fulfill the requirements described above (positive angle of impingement) with respect to the direction of flow.

The agitator used in the invention need not be a rotary agitator with a vertical shaft. In fact, depending upon circumstances, a plurality of agitator types may be used. But in the mixing process according to the invention the complemental raw material is introduced intermittently into the vessel in lot sizes of a given amount, so that when an agitator is used which causes three-dimensional mixing in the mixing vessel, the composition of the material at the discharge outlet will change from moment to moment. In order to counteract this occurrence of such an undesired phenomenon, preferably a rotary agitator with an essentially vertical shaft and with agitator vanes is used whose configuration permits only a horizontal movement of the material, i.e., a purely two-dimensional horizontal agitation. When such an agitator is used, the raw material causes a packing flow. It is also possible to prevent a heterogeneous composition, which is developed for a short while in the upper portion of the vessel, from being transmitted directly to the material at the discharge outlet disposed in the floor area of the vessel. By means of the horizontal agitation process as described in Japanese Patent Application No. 81,706/72, any heterogeneity in the composition of the raw materials occurring in the vertical direction at a point directly behind the feeding point for the raw material can be completely eliminated before the raw material reaches the discharge outlet.

The shape of the mixing vessel is likewise not limited to the one described and illustrated. In the mixing device of the invention the complemental raw material is fed from the upper portion of the vessel and can move downwardly in the vessel naturally due to its own weight. The mixture is delivered from the lower zone of the vessel. Consequently, the shape and configuration of the mixing vessel is of no particular significance, as long as the natural downward movement of the raw material can occur relatively uniformly over the whole cross section of the vessel and as long as the agitation extends over the whole horizontal cross section.

In the process of the invention one or more complemental raw materials may be admixed with the main raw material. As long as in the upper part of the mixing vessel there is an adequate chamber into which a solid-type complemental raw material is introduced, it is possible to use any kind of conventional metering and feeding device which permits the material to be metered and fed only into the open. In this way an excellent automatic dyeing apparatus is created by means of which both highly viscous, liquid coloring agents as well as solid-type, complemental raw materials can be admixed with a main raw material. In a conventional automatic dyeing apparatus in which a liquid coloring agent, more particularly, a liquid or paste, is used which is formed by the dispersion of a pigment, it has been found difficult, due to the flow resistance, to feed a small amount of a highly viscous coloring agent with a high degree of accuracy in a long tube extending to the main raw material. In order to prevent harmful influences on the physical properties of the synthetic used as the main raw material, it is necessary to reduce the mixing ratio as far as possible and especially to bring the viscosity of the coloring agent up to an optimum value. However, due to the flow resistance in the said tube, this goal was not reached in the traditional automatic dyeing apparatus. Since in the mixing device of the invention the upper zone of the mixing vessel has adequate space (see FIGS. 6 and 9) in which to mount devices or mechanisms, a small capacity pump for a highly viscous fluid, such as a gear pump, may be mounted directly in the upper portion of the device of the invention, the suction side of the pump being connected directly to a container for the coloring agent. The delivery side of the pump is connected to the mixing vessel by way of a short delivery pipe. In this way the above mentioned difficulty caused by the flow resistance can be eliminated and a highly viscous fluid coloring agent can be fed readily with a high degree of metering accuracy. Over and beyond this, in the automatic dyeing apparatus of the invention at the same time a solid-type complemental raw material such as recycled granules can be fed in and may be mixed together with the above mentioned highly viscous coloring agent.

We claim:

1. A mixing vessel for mixing a main material and complemental raw materials in a fixed ratio comprising:
   (a) walls defining a substantially vertical mixing vessel and an outlet port at the bottom of the vessel such that the mixture in the vessel moves downwardly by its owns weight at the rate it is withdrawn through the outlet port,
   (b) a feed conduit for delivering synthetic materials under their own weight to the vessel, said conduit opening into the vessel below the top thereof and said conduit having an opening disposed such that it assumes an angle of impingement relative to the line of flow whereby the vessel will not accept main material from the feed conduit when the vessel already contains a mixture at or exceeding the height of the feed conduit opening,
   (c) means for feeding complemental raw material above the level of the mixture therein in metered amounts proportional to the mass rate of flow of the material withdrawn from the vessel, and
   (d) rotating agitator means disposed in the vessel for mixing and distributing the materials uniformly therein.

2. A mixing vessel according to claim 1 in which the rotating agitator is provided with an essentially vertical shaft, the feed conduit opens through the side of the mixing vessel and the apertural section of the feed conduit extends parallel to the inner wall.

3. A mixing vessel according to claim 1 in which the rotating agitator is provided with an essentially vertical shaft, the feed conduit opens into the interior of the mixing vessel and the apertural section of the feed conduit is disposed such that it impinges upon the agitator current.

4. A mixing vessel according to claim 1 in which the metering mechanism for the complemental raw materials comprises a volumetric metering mechanism equipped with a control device and a generating means providing an output signal corresponding to the mass flow rate of the material delivered from the vessel, said output signal fed back to control the said control device.

* * * * *